United States Patent
Feng et al.

(10) Patent No.: US 9,428,420 B2
(45) Date of Patent: Aug. 30, 2016

(54) CONCRETE COMPOSITION AND PROCESS

(71) Applicant: Space Coatings Inc., Albany, CA (US)

(72) Inventors: Sean Peishen Feng, El Cerrito, CA (US); Kathleen Marie Rai, Albany, CA (US)

(73) Assignee: SPACE COATINGS INC., Albany, CA (US)

( * ) Notice: Subject to any disclaimer, the term of this patent is extended or adjusted under 35 U.S.C. 154(b) by 112 days.

(21) Appl. No.: 14/459,326

(22) Filed: Aug. 14, 2014

(65) Prior Publication Data

US 2016/0046527 A1     Feb. 18, 2016

(51) Int. Cl.
| | |
|---|---|
| *C04B 28/04* | (2006.01) |
| *C04B 14/06* | (2006.01) |
| *C04B 16/06* | (2006.01) |
| *B01F 13/00* | (2006.01) |
| *B01F 3/18* | (2006.01) |
| *B28C 5/00* | (2006.01) |
| *B28C 5/08* | (2006.01) |

(52) U.S. Cl.
CPC ............... *C04B 28/04* (2013.01); *B01F 3/18* (2013.01); *B01F 13/0052* (2013.01); *B28C 5/003* (2013.01); *B28C 5/0812* (2013.01); *B28C 5/0887* (2013.01); *C04B 14/06* (2013.01); *C04B 16/0625* (2013.01); *C04B 2201/52* (2013.01)

(58) Field of Classification Search
CPC ... C04B 28/04; C04B 16/0625; C04B 14/02; C04B 20/0096; C04B 40/0028; C04B 2201/52; C04B 2103/32; C04B 2103/40; C04B 2103/50; B28C 5/0887; B28C 5/0812; B28C 5/003; B01F 3/18; B01F 13/0052
See application file for complete search history.

(56) References Cited

U.S. PATENT DOCUMENTS

| | | | | |
|---|---|---|---|---|
| 3,018,880 A | * | 1/1962 | Brugmann | B65D 88/1618 106/817 |
| 3,260,414 A | * | 7/1966 | Mora | B28C 7/0084 222/145.7 |
| 4,686,852 A | * | 8/1987 | Ito | G01N 33/383 366/140 |
| 8,303,708 B2 | | 11/2012 | Rigaud et al. | |
| 2012/0061284 A1 | * | 3/2012 | Pasquier | C04B 18/02 206/568 |

FOREIGN PATENT DOCUMENTS

| | | | |
|---|---|---|---|
| DE | 2937851 A | * | 3/1981 |
| JP | 61-251544 A | * | 11/1986 |
| RU | 1794713 A1 | * | 2/1993 |
| SU | 682471 A | * | 9/1979 |

* cited by examiner

*Primary Examiner* — Anthony J Green
(74) *Attorney, Agent, or Firm* — Lin & Associates Intellectual Property, Inc.

(57) ABSTRACT

A concrete comprises in relative parts by weight: 100 of Portland cement; 0.25 to 9 of a defoamer; 0.001 to 6 of a surfactant; 0 to 230 of coarse gravel and/or fine gravel and/or shear enhancers; 0 to 85 of sand; 0 to 60 of a particulate pozzolanic or non-pozzolanic material or a mixture thereof having a mean particle size less than 15 micrometers; 0 to 80 of a particulate pozzolanic or non-pozzolanic material or a mixture thereof having a mean particle size between 15 to 88 micrometers; 0.3 to 18 of a water-reducing superplasticizer; 0 to 14 of polyethylene fibers; and 5 to 40 of water. An air mixing process using a tightly sealed mixing tool is used to thoroughly mix the constituents of the concrete before adding the water for curing. By adjusting relative parts in the composition, concretes of high and ultrahigh performance can be achieved efficiently.

14 Claims, 7 Drawing Sheets

CONCRETE COMPOSITION AND PROCESS

BACKGROUND OF THE INVENTION

1. Field of the Invention

The present invention relates generally to concrete and more specifically to a new ultrahigh performance concrete (UHPC) composition and a process of preparing it.

2. Description of Related Arts

Concrete is widely used in the construction industry because it is economical, ubiquitous, and durable with considerable compressive strength. In previous arts, without large aggregate in UHPC formulations, achieving sufficient shear in mixing is a challenge. With only fine particles composition, the existing state-of-the-art UHPC slurry is relatively viscous, requiring a costly upgrade from existing drum mixer to high-viscosity specialized mixer that has smaller production quantities but more energy consumptions to produce it.

Furthermore, transportation and placement of UHPC has challenges. The curing treatment applied to concrete with steam treatment requires a controlled environment, which may not always be feasible in field pouring conditions.

U.S. Pat. No. 8,303,708 issued to Lafarge presents a ductile UHPC. Lafarge attempts to optimize packing theory by paying careful attention to granular sizing variables and achieving a consistent production quality. This strict sizing and quality control severely limits the available locations where the constituents can be sourced, which means formulation adaption of local materials is prohibitively expensive and laborious.

Instead of formulation adaption, Lafarge's UHPC material is shipped remotely to jobsites with multiplied costs. Facing difficulties in transporting large UHPC-structures, Lafarge markets its UHPC instead as joint fill with better success compared to efforts in mass-distributed mainstream applications.

Besides the aforementioned drawbacks, i.e., strictly-sourced fine particles only, costly equipment upgrades, and high-shear slurry, production time is also multiplied. Known prior arts also focus on the choice of conventional fibers, namely, made of steel, glass, polypropylene, and/or PVA (polyvinyl alcohol) which are often proven to be undesirable. Moreover, the conventional fibers are less physically compatible to concrete or poor in handling high pH.

SUMMARY OF THE INVENTION

The present invention has been made to overcome the above-mentioned drawbacks and deficiencies of the conventional concrete and UHPC. A primary object of the invention is to provide a concrete with tunable made-to-order compression and tension capabilities from conventional to ultrahigh strength levels.

Accordingly, the concrete comprises in relative parts by weight: 100 of Portland cement; 0.25 to 6 of a defoamer in either powder or liquid form; 0.001 to 6 parts by weight of a surfactant; 0 to 230 of coarse gravel and/or fine gravel and/or shear enhancers; 0 to 85 of sand; 0 to 60 of a particulate pozzolanic or non-pozzolanic material or a mixture thereof having a mean particle size less than 15 micrometers ($\mu m$); 0 to 80 of a particulate pozzolanic or non-pozzolanic material or a mixture thereof having a mean particle size between 15 to 88 micrometers ($\mu m$); 0.3 to 18 of a water-reducing superplasticizer; 0 to 14 of polyethylene fibers; and 5 to 40 of water.

Another object of the present invention is to provide a process coined "air mixing" for preparing and manufacturing the concrete of the present invention. The process comprises a step of using a traditional mixing drum to incorporate the cement, particulate pozzolanic or non-pozzolanic material, powder defoamer, fly ash, farm by-product ash (such as rice husk), volcanic ash, and limestone powder, or a combination of the constituents described above to form a powder mixture, with coarse and/or fine gravel and/or shear enhancers and optionally fibers to form a mixture of desired composition. The traditional mixing drum is then hermetically sealed with a specially-fitted lid, and the desired composition is thoroughly mixed to form a uniformly-distributed concrete mixture. Finally, water and sand are added and mixed to form a concrete mixture ready to cast and cure.

A further object of the present invention is to provide a method of screening the coarse gravel and/or shear enhancers out of the concrete mixture to form paste-only concrete which is useful for high tensile and/or ultrahigh compressive applications and/or thin-shell applications. By using a flat-bottom shoot and a grill composed of parallel metal bars, the gravel and/or shear enhancers can be filtered out from evenly moist concrete mixture.

It is also an object of the present invention to provide a hybridized method for better controlling and preventing premature curing while pumping, mixing, transporting and stowing the concrete mixture with methods coined "vibratile pumping", "vibratile mixing", "vibratile transporting", and "vibratile stowing". The hybridized method of the present invention attaches a vibrator to the equipment used in pumping, mixing, transporting or stowing to stir the concrete mixture continually to postpone chemical curing reaction. The vibratile-hybridized method is essential to protract the workability of UHPC, which otherwise will often be hardened out of plasticity in 15 minutes or less.

BRIEF DESCRIPTION OF THE DRAWINGS

The present invention will be apparent to those skilled in the art by reading the following detailed description of preferred embodiments thereof, with reference to the attached drawings, in which:

FIG. 5 shows the metal bars each having an oval shape cross-section.

FIG. 5A shows the metal bars each having a substantially rectangular shape cross-section with rounded top and concave bottom.

DETAILED DESCRIPTION OF THE PREFERRED EMBODIMENTS

Figure 1:
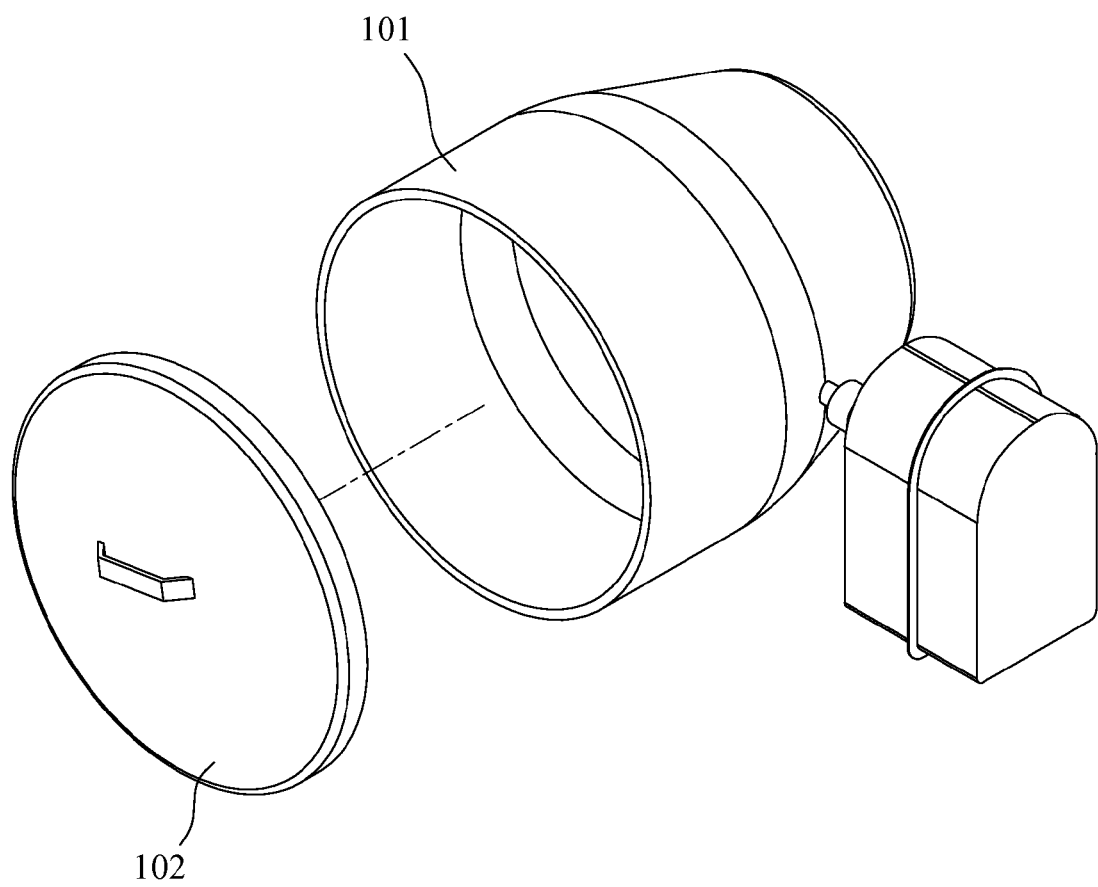
FIG. 1 shows a rotating drum and a specially-fitted lid for the airmixing process according to the present invention.

The present invention provides a concrete with tunable made-to-order compression and tension capabilities, anywhere from conventional to ultrahigh strength levels. The concrete comprises in relative parts by weight: 100 of Portland cement; 0.25 to 9 of defoamer in either powder or liquid form; 0.001 to 6 parts by weight of surfactant; 0 to 230 of coarse gravel and/or fine gravel and/or shear enhancers; 0 to 85 of sand; 0 to 60 of a particulate pozzolanic or non-pozzolanic material or a mixture thereof having a mean particle size less than 15 micrometers (μm); 0 to 80 of a particulate pozzolanic or non-pozzolanic material or a mixture thereof having a mean particle size between 15 to 88 micrometers (μm); 0.3 to 18 of a water-reducing superplasticizer; 0 to 14 of polyethylene fibers; and 5 to 40 of water.

The concrete composition and process of the present invention can be used to boost concrete performance, to reduce concrete material and production costs, or to do both. This composition and process will be industrial-scalable for cost-effective, locally-sourced, fast production, and readily deployable for various regions/countries.

The concrete composition and process can be utilized and modified to make various types of concrete including but not limited to: Ultra-High Performance Concrete (UHPC), High Performance Concrete (HPC), High Strength Concrete (HSC), Regular concrete, and specialty concrete such as colored concrete, Self-consolidating concretes, Vacuum concrete, Shotcrete, Limecrete, Cellular concrete, Cork-cement composites, Engineered Cementitious Composite, Glass concrete, Bituminous concrete, Rapid strength concrete, Rubberized concrete, Polymer concrete, Geopolymer concrete, Refractory cement, Concrete canvas, and Gypsum concrete.

To achieve higher compression strength such as 18 kilo pounds/in$^2$ (ksi) or above with close to 0 inch slump, the concrete composition in the relative parts by weight can be adjusted with 0.25 to 9 of the defoamer, 0 to 180 of coarse gravel and/or fine gravel and/or shear enhancers, 0.3 to 18 of water-reducing superplasticizer, and 5 to 30 of water in the composition. In the deployment, the concrete has to be prolong-vibrated, or force-packed by weight such as with a roller or concrete packer, or a combination of both vibration and force-packing.

The usage of optional gravel and sand are dictated by the local supply qualities and availabilities, for instances, in the San Francisco Bay Area, sand dragging is limited due to environmental reasons and its quality can be used for 20 ksi compressive concrete but will fail to exceed 32 ksi. However, in distance islands such as Hawaii and Guam, local sea-dragged sand is structurally weak so reducing or eliminating its quantity may be desirable. When local gravel has an indenting strength much lower than the target strength of the concrete, it will not be suitable for such ultrahigh strength products of 18 ksi and above.

A more economical and less labor-intensive concrete than the 18+ ksi concrete, which is applicable in majority of all concrete construction projects, can be accomplished by having 100 to 230 of coarse gravel and/or fine gravel, 0.3 to 14 of water-reducing superplasticizer, and 18 to 40 of water in the composition. This concrete can self-consolidate and self-level, can be pumpable, and has achieved from 5 ksi to 18 ksi in compression strength without special curing treatments.

According to the invention, if the coarse gravel is to be reduced or eliminated, the fine gravel and/or shear enhancers shall increase while other constituents are held constant. Sand is an optional filler that may decrease the total material costs but often reduce and fluctuate the strength of the concrete. If the water-reducing superplasticizer is to be reduced or eliminated, the water ratio has to increase with other constituents being held constant, and the strength of the concrete will decrease.

If the particulate pozzolanic or non-pozzolanic material or mixture having a mean particle size of less than 15 micrometers is to be reduced or eliminated, the cement ratio shall increase while other constituents are held constant. If the particulate pozzolanic or non-pozzolanic material or mixture having a mean particle size between 15 to 88 micrometers is to be reduced or eliminated, the cement ratio shall increase while other constituents are held constant with optional ratio increase of the mixture or material having a mean particle size of less than 15 micrometers.

Using a traditional slow-tumbling, stationary or in-transit mixer for conventional concrete, i.e., a rotating drum with internal blades or helical paddles designed to lift and tumble ingredients onto itself, the concrete of the present invention can be produced with a new process coined "airmixing". It is important to note that in the conventional concrete process, water is added early together with cement, sand and pozzolanic or non-pozzolanic material and mixed in the mixer. In the airmixing process of the present invention, however, water should not be added until all the non-liquid materials (except sand because its higher moisture content often prevents proper airmixing, and its larger particle sizes make it much more dispersible than fine powders, thus it can be added after airmixing is complete) have been "airmixed" in an hermetically sealed mixer to form a uniformly distributed mixture.

To airmix effectively, a traditional mixing drum first incorporates all the powders, composed of cement, limestone powder, silica fume, fly ash, burned rice husk ash, blast-furnace slag, diatomaceous earth powder, ground fine quartz, wollastonite powder, or any other particulate cementitious or pozzolanic or non-pozzolanic material or a mixture thereof, whose combination may be composed of one or some or all of the composition described above.

The defoamer may be in either powder or liquid form. Examples of defoamer include blend of liquid hydrocarbons, fatty compounds and little silicone on an inorganic carrier, and blend of liquid hydrocarbons and polyglycols on an inorganic carrier. If powder forms of the defoamer are used, they should be incorporated with all other powders for airmixing. If liquid forms of the defoamer are used, they are added immediately after all dry powders are verified to have been mixed evenly.

Surfactants are wetting agents for lowering the surface tension between the liquid and the concrete mixture. Surfactants have long-chain organic molecules with one end being hydrophobic and the other end being hydrophilic. The hydrophilic end contains one or more polar groups, such as —COO—, —SO3— or —NH3+. Similar to the defoamer, if powder forms are used, they should be incorporated with all other powders for airmixing. If liquid forms are used, they are added immediately after all dry powders are verified to have been mixed evenly.

The coarse or fine gravel or both shall then be added to provide medium-speed shear from mainly gravitational force because tumbling gravel will not be affected by air resistance as much as the powder will. The drum is then sealed with a specially-fitted lid, which can be made of plastic, metal, composite material, or any material that can withstand recurring impacts from the gravel. FIG. 1 shows a rotating drum 101 and a specially-fitted lid 102 for the airmixing process according to the present invention. For simplicity, internal blades or helical paddles in the rotating drum are not shown in the drawing.

Inside the mixing drum, air will suspend and distribute the powder particles diffusively, while the gravel will shear the powder mixture by impacting and scattering the powder, resulting in very predictable uniformly-distributed concrete mixture. If desired, fibers can also be added to the powder mixture. Polyethylene fibers are durable and won't break with early incorporation with powder-gravel tumbling. Since the gravel is airmixed with powders, it could also be placed into the mixer first and then followed by the powders.

Figure 2:
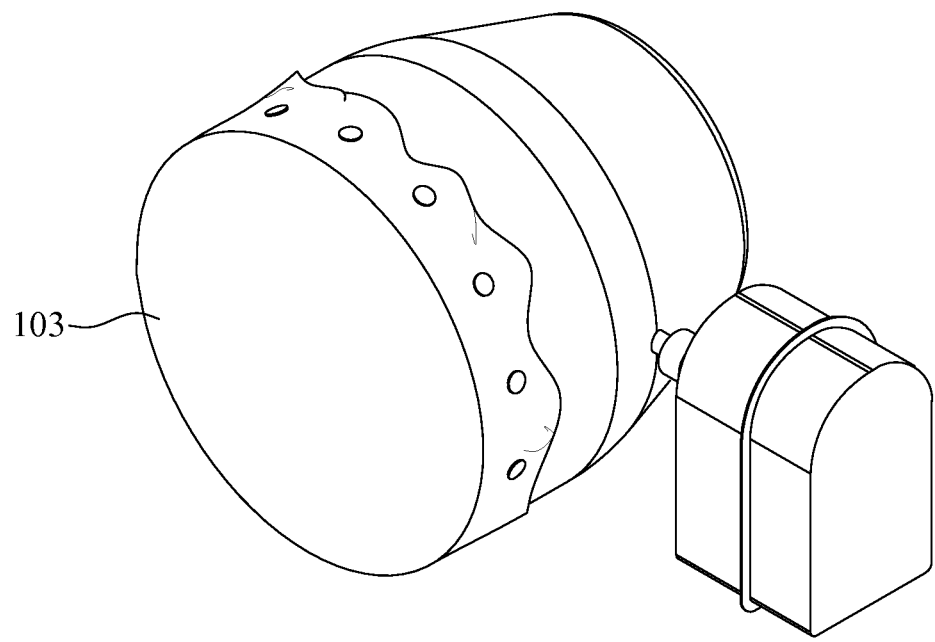
FIG. 2 shows that the rotating drum is hermetically sealed by a plastic sheet taped with magnets according to the present invention.
Figure 2A:
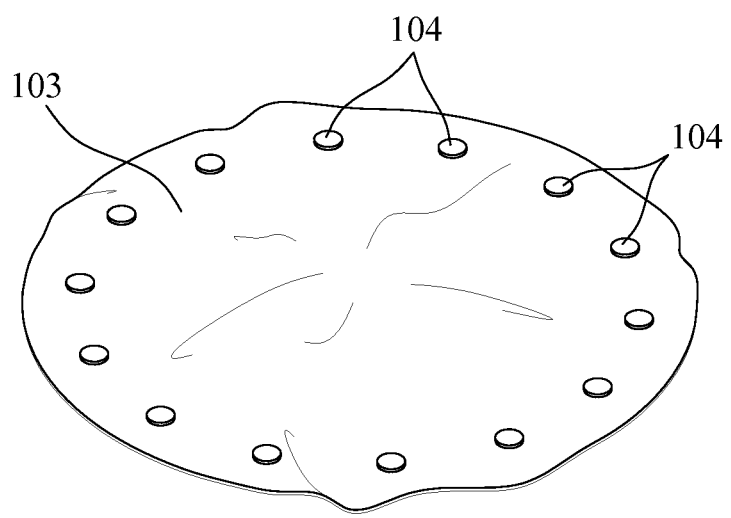
FIG. 2A shows that the magnets are adhered on the plastic sheet near the outer circumference.

As an example for airmixing, in order to contain dust and to keep the concrete quality more consistent, a plastic sheet 103 larger than the mixer opening can be custom cut as illustrated in FIGS. 2 and 2A. The plastic sheet 103 shown in FIG. 2A is taped with magnets 104 spaced evenly at the outer circumference to cover and seal the lid opening as shown in FIG. 2. This magnets-adhered sheet is a quick, economical, durable, and convenient cover for air mixing, in a laboratory or production environment.

If a higher strength is desirable (compression anywhere from 18 to over 30 ksi and/or tension anywhere from 1 ksi to over 10 ksi), the coarse/fine gravel above can be substituted with shear enhancers that can be screened out of the final mixture. Examples of shear enhancers include polished stones or custom-made metal or concrete-casted balls with size equal or larger than ¾ inches in diameter that can generate the medium-speed shear, but remain effective against air resistance and will neither shatter nor disintegrate by repeated impacts against the mixing drum. The shear enhancers need to be high density enough to not lose too much velocity to finished impacting and penetrating the powders but small enough to fit into the crevices of the mixing drum and its blades/paddles, but large enough that they can be screened out cost-effectively. The shear enhancers are shown to work efficiently with different kinds and sizes in a single mixing and do not need to be uniform.

For a twin-shaft, vertical axis, or horizontal axis concrete mixer, which is used for high viscosity concrete common for precast, airmixing is modified to multiply the production quantity per batch. In the modified airmixing, most if not all of the gravels will be preplaced into the concrete forms separately without mortar paste. The residual constituents of concrete formulation are airmixed in the mixer to eventually create a mortar paste and then loaded into the gravel-prefilled forms. To maximize adhesion amongst mortar paste and prefilled gravels, a vibration source may be applied externally to the form or internally if the form is not too deep. Since concrete mixture can have up to 60% or more of gravel by volume, this modified airmixing can effectively double the production quantity and also maximize the gravel usage.

If metal balls are used as the shear enhancers, one can take advantage of their magnetic properties and/or density difference to concrete during the process of screening out the shear enhancers. That is, their removal process might involve strong magnetic and/or vibration to float or submerge the metal balls, and then extract them from the concrete mixture.

Without the shear enhancers and/or gravels, the water added later will not mix well into the powders. The powder mixture-only shear force will be insufficient to break the wet coagulated powders into an evenly moist mixture. As a result, the wet coagulated powders will flocculate into sticky powder pancakes without the shear enhancers and/or gravel.

To filter out the shear enhancers in the evenly moist mixture, the shear enhancers can be manually removed if the production is small-scale, occasional or laboratorial. As the concrete is vibrated with a flat tilting pan, the concrete will consolidate into a flowing mass of paste, and operators can see the larger shear enhancers bulging out against the pan and remove them manually.

Figure 3:
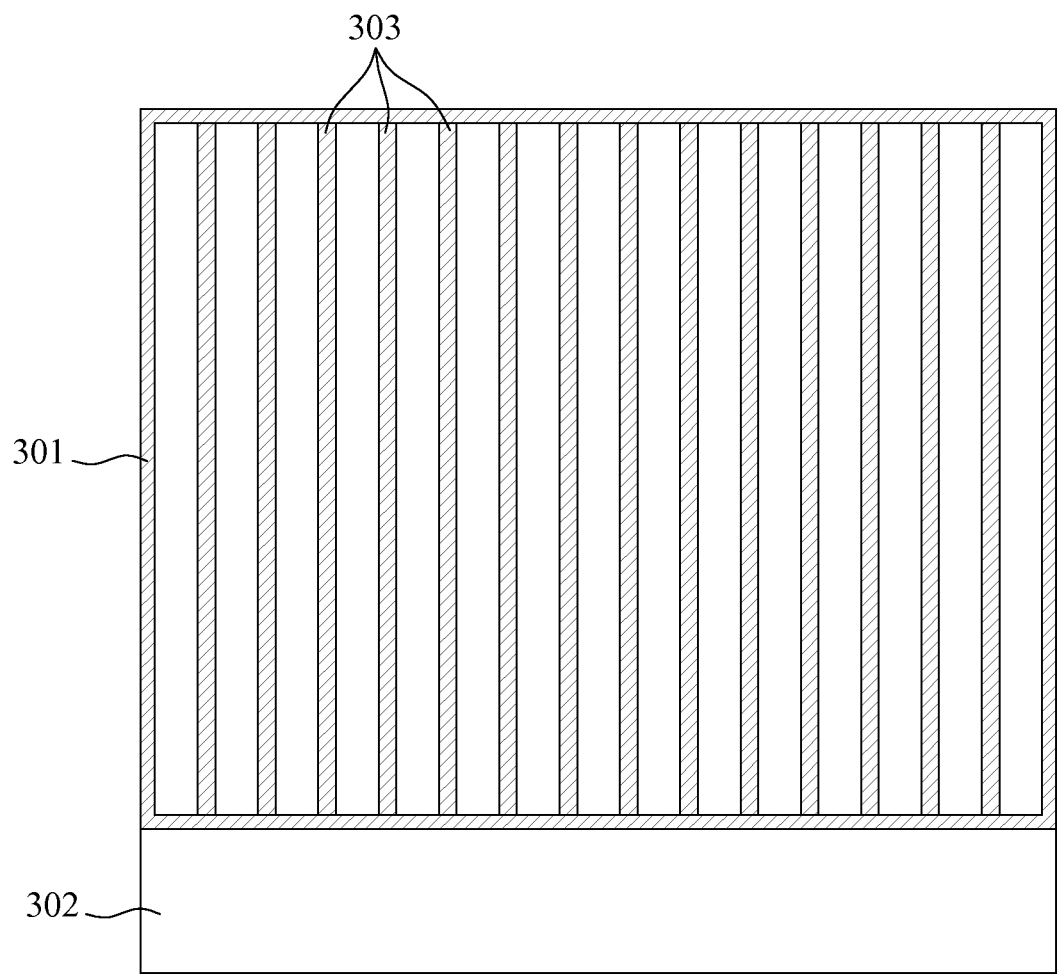
FIG. 3 illustrates an example of a removal grill with a bottom catch tray for catching rolling-off gravels or shear enhancers according to the present invention.
Figure 4:
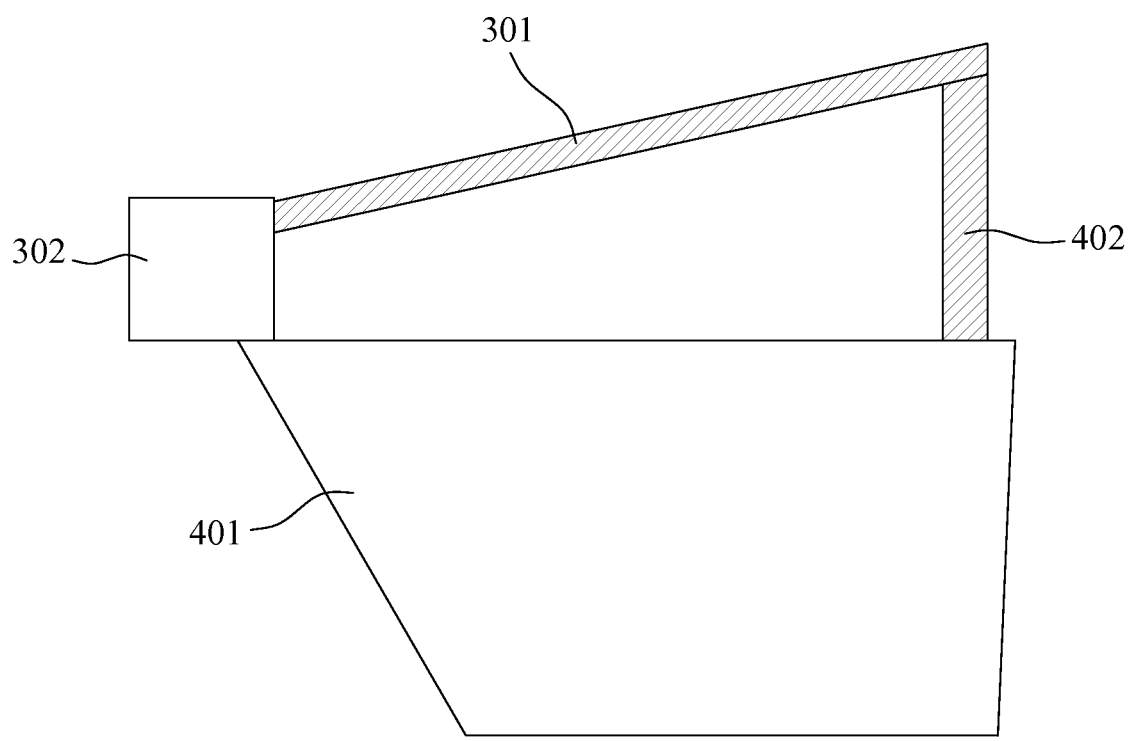
FIG. 4 shows that the removal grill is supported above a concrete collector.

To automate the shear enhancer removing process, the flat tiling pan can be replaced with a flat-bottom shoot with a square aperture facing down and a removable grill installed. The flat-bottom shoot and the removal grill are agitated by an affixed vibration motor. FIG. 3 illustrates the top view of a removal grill 301 with a bottom catch tray 302 for catching rolling-off gravels or shear enhancers according to the present invention. The removal grill is composed of parallel metal bars 303 that lead into a wash catch tray with the whole aforementioned setup tilting into the catch tray. FIG. 4 shows that the removal grill 301 is supported above a concrete collector 401 by a support 402.

For the grill, the parallel metal bars are spaced narrower than the average diameter of the shear enhancers. If the bar spacing is too narrow, the concrete paste will flow down too slowly through the grill. The bar spacing cannot be too wide either, or the shear enhancers will be jammed between bars and cannot roll automatically into the bucket.

Figures 5, 5A:
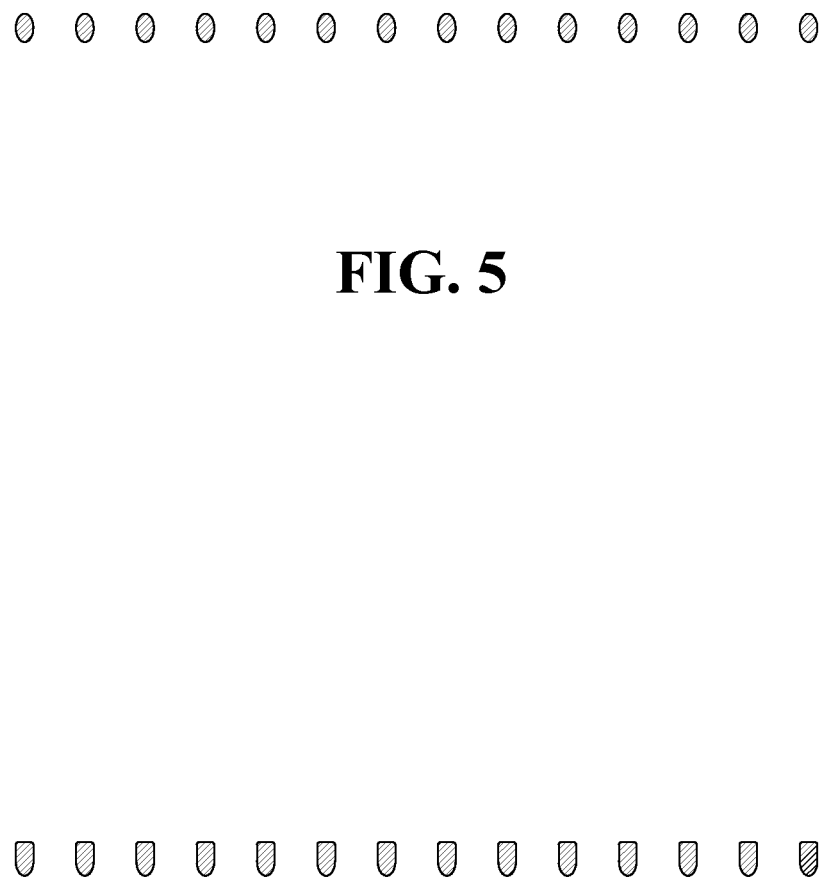

The cross-section of the metal bars should maximize fluid dynamic efficiency and minimize fiber entanglement, e.g., an oval or teardrop shape as shown in FIG. 5, or a rectangle shape with rounded top and concave bottom as shown in FIG. 5A. After grill screening, the shear enhancers should be water-cleaned with jet-rinsing and/or scrubbing, and then reused.

With the grill screening the reusable shear enhancers, the concrete paste will drop below, which then can be collected into a hopper ready for pumping. This paste-only concrete is useful for high tensile applications and thin-shell applications. For high compression application, paste-only concrete might be unnecessary and definitely too costly because crashed gravels with reasonable compression will already produce UHPC with compressive strength greater than 25 ksi. Higher compressive but expensive gravels such as ones imported from British Columbia can achieve even higher compression.

In comparison, conventional thinking dictates that water shall be incorporated ideally early in concrete mixing to wet the powders early and to control dust. However, because fine and/or ultrafine powders used in concrete are chemical amalgamates with hydrophobic facets, the powder particles often flocculate against water and do not disperse and separate into each minimal individual particle. Examples of hydrophobic facets include the silico-aluminates and other siliceous substances that are relatively hydrophobic, but they are the main constitutes in the pozzolanic powders.

If a dry mixing has to be used, previous arts regard the powder-air turbulence as hazardous condition to workers who should be masked and stayed at the upwind. The powder-air turbulence should be blown away by wind or should be vacuumed into a collector and possibly pumped back into cement/pozzolanic powder. The previous arts perceive that the losses from the powder-air turbulence have little or no bearings on the final concrete mixture and that the purpose to contain or cover the powder-air turbulence is to prevent a hazardous material from polluting the air.

The present invention asserts instead that capturing and harnessing the powder-air turbulence can improve the mixture consistency and concrete strengths. To optimize packing theory, the particles in the turbulence are also valuable in improving strength and impermeability because the finer particles such as silica fume are easier to disperse evenly by air turbulence than by watery paste.

Adding water and/or liquid additives shall be delayed until the solid-ingredient airmixing is almost/already complete. For Water-to-Cement ratio (hereinafter referred to as W/C), to attain high or ultrahigh strength, a small water quantity of 30% W/C or much less has demonstrated repeatedly to be feasible in the laboratory; or to make the concrete fluid enough to be pump-able, an increased W/C ratio is acceptable with reduction of compressive and tensile strengths. For low W/C formulation, water can be introduced earlier but will impede and decelerate the even distribution of airborne powder and powder scattering and thus prolong the mixing time. Water needs to spray onto the tumbling materials while avoiding the rotating drum to minimize undesired sticking. Water flowing too quickly into the mixture without spraying can create a sticky mess that requires scraping to clean the drum.

Air mixing results in significant efficiency boost, strength increase, and reduction in strength variation. Compared to conventional mixing around 6 minutes per batch, air mixing takes total 3 minutes or less instead. With the advanced formulations according to the present invention, the air mixing efficiency difference is multifold especially with added fibers that are difficult to deflocculate. Unlike a gray wet glop of conventional mixing, air mixing remains a dry powdery mix until water is added, hence it is feasible and advisable to inspect visually the dry mix to assure consistency. In reduction of strength variation, the strength of a 10.5 ksi compressive self-consolidated concrete (SCC) mixture has achieved standard variation of 72 psi.

Figure 6:
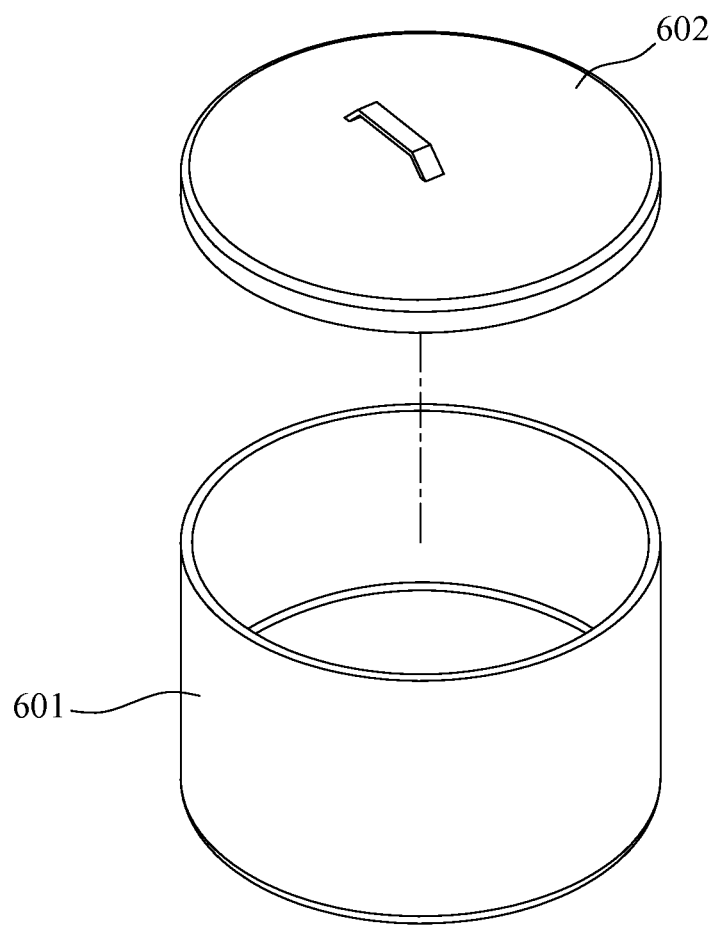
FIG. 6 shows a pan mixer and a top cover for the airmixing process according to the present invention.
Figure 7:
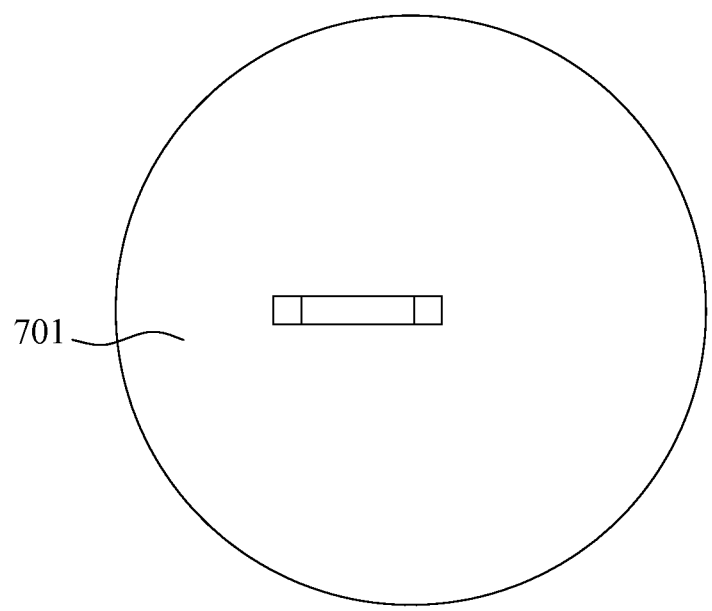
FIGS. 7 and 7A show the top and bottom views of a modified top cover that has a sealing material formed on the underside of the top cover near the outer circumference.
Figure 7A:
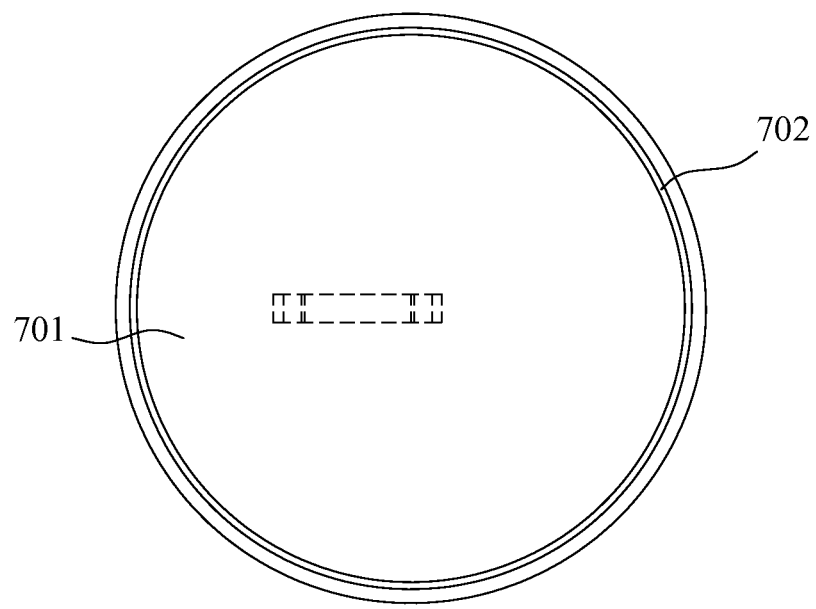

If a concrete pan mixer is used instead of a drum mixer, the air mixing process will still remain similar if not identical. FIG. 6 shows a pan mixer 601 and a top cover 602 for the airmixing process according to the present invention. Similarly, internal blades or helical paddles are not shown in the pan mixer 601 for simplicity. With its folding mixing action, the pan mixer should be modified so that it can be airtight with a top cover with robust seals. FIGS. 7 and 7A show the top and bottom views of a modified top cover 701 with a sealing material 702 formed on the underside of the top cover 701 near the outer circumference. Examples of a sealing material 702 are the car door trim strip gaskets.

After the concrete is poured and emptied, the mixer should be cleaned either immediately or periodically as a function of concrete residue thickness buildup and how much curing has occurred because the resulting HSC or HPC or UHPC residue may coat and cure inside the mixer stubbornly. Otherwise, the residue removal will require laborious work with potential damages to the mixer drum or pan. After emptying, a water jet should be employed to wash away any residue, paying special attention to surfaces, corners, and crevices on or adjacent to its internal blades or helical paddles. To verify residue absence, it is highly advised to inspect the mixer's interior either visually or via a video camera.

With a lower W/C concrete, which can be too viscous to pump and too quick to cure, vibrators can be appended as countermeasures, in a process coined "vibratile pumping". That is, for a concrete pump, every rigid or semi-rigid section in contact with concrete may have a vibrator attached, depending on if an adjacent vibrator already transmits enough wave energy to shear-thin the concrete sufficiently, from the pump hopper, to each pipe of the boom system, and to nozzle or placing hose. Due to the pseudo-plasticity of concrete, this combination of pumping with vibration can increase the efficiency of concrete placement.

Besides employing vibration to assist pumping, it can also be used to prevent premature curing while mixing, transporting, and stowing; namely, "vibratile mixing", "vibratile transporting", and "vibratile stowing". In the laboratory, a rapid-curing concrete that solidifies in 15 minutes has shown to remain pourable even after 60 minutes of vibratile stowing.

For vibratile mixing, for the example in precast production, while the mixing is complete but if the crane bucket has malfunctioned and is in repair, to postpone curing, either a vibration motor affixed temporarily or permanently to the mixing pan or drum can be actuated, or a worker can use a detached concrete vibrator to stir continually the concrete mixture if the concrete quantity is small enough that all of the concrete within is vibrated effectively.

For vibratile transporting, instead of just relying on mixing truck's rotating drum, an attached vibrator motor can shake the concrete so that the cementitious and/or pozzolanic reaction do not have sufficient time to bond and cure. The vibratile directions should be aimed so to achieve maximum pulsating movements, e.g., not fighting against mounting bearings of the drum but along the rotational movements of the drum. As another example of vibratile transporting, a crane bucket can also have a vibration motor affixed. If the crane bucket cannot be poured out and must wait for precast mold or some other production issue, the affixed vibration motor can be activated. In other words, in any point after the concrete is mixed and ready to cast, a vibrator can be used to postpone the chemical curing reaction and give a longer pot life to the concrete.

According to the present invention, UHPC samples exceeding compressive strength of 25 ksi and far surpassed postcracking tensile strength of 1.2 ksi have been manufactured and proven, utilizing local materials and existing slow drum mixers without any curing treatment.

If the local coarse or fine aggregates have an average crush strength that will meet or exceed the target UPHC compressive strength, the aggregates can be used as fillers into the mixture. According to the present invention, compressive strength has exceeded 24 ksi with aggregates embedded. For the 28-day 10.5 ksi compressive pumpable SCC, a 9.5 inch slump is achieved while more than 42% of the mixture weight is cost-effective coarse gravels. In addition, 7-day 10 ksi compressive pumpable SCC is also achievable. No special post treatment is needed for the concrete.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A process of preparing a concrete, comprising in sequence the steps of:
   using a mixing tool, which includes a container and a tumbling mechanism in the container, to form a powder mixture by incorporating and tumbling cement and at least one or a combination of particulate pozzolanic material, non-pozzolanic material, and water-reducing superplasticizer in the container of the mixing tool;
   adding at least one or a combination of fine gravel, coarse gravel, and shear enhancers to the powder mixture to form a cement mixture;
   sealing the container of the mixing tool hermetically;

mixing the cement mixture thoroughly in the hermetically sealed container of the mixing tool to form a uniformly-distributed concrete mixture;

optionally adding sand to the uniformly-distributed concrete mixture; and adding liquid additives and mixing water with the uniformly-distributed concrete mixture with or without sand, the liquid additives being selected from the group consisting of defoamers and wetting agents in liquid form;

wherein sand should be optionally added only after the step of mixing the cement mixture thoroughly in the hermetically sealed container of the mixing tool to form the uniformly-distributed concrete mixture.

2. The process of preparing a concrete according to claim 1, wherein the concrete comprises in relative parts by weight:

100 parts by weight of Portland cement;
0.25 to 9 parts by weight of a defoamer in either powder or liquid form;
0.001 to 6 parts by weight of a surfactant;
10 to 230 parts by weight of at least one or a combination of coarse gravel, fine gravel and shear enhancers;
0 to 85 parts by weight of sand;
0 to 60 parts by weight of a particulate pozzolanic or non-pozzolanic material or a mixture thereof having a mean particle size less than 15 micrometers;
0 to 80 parts by weight of a particulate pozzolanic or non-pozzolanic material or a mixture thereof having a mean particle size in a range between 15 micrometers and 88 micrometers;
0.3 to 18 parts by weight of a water-reducing superplasticizer;
0 to 14 parts by weight of polyethylene fibers; and
5 to 40 parts by weight of water.

3. The process of preparing a concrete according to claim 2, wherein the at least one or a combination of coarse gravel, fine gravel and shear enhancers includes 100 to 230 parts by weight of at least one or a combination of coarse gravel and fine gravel, the weight of the water-reducing superplasticizer is 0.3 to 14 parts by weight, and the weight of the water mixed with the uniformly-distributed concrete mixture is 18 to 40 parts by weight.

4. The process of preparing a concrete according to claim 2, wherein the weight of the defoamer is 0.25 to 6 parts by weight, the weight of the at least one or a combination of coarse gravel, fine gravel and shear enhancers is 10 to 180 parts by weight, the weight of the water-reducing superplasticizer is 0.3 to 18 parts by weight, and the weight of the water mixed with the uniformly-distributed concrete mixture is 5 to 30 parts by weight.

5. The process of preparing a concrete according to claim 1, wherein the step of sealing the container of the mixing tool hermetically is accomplished by using a plastic sheet taped with magnets to cover and seal a lid opening of the container of the mixing tool, the magnets being evenly spaced and taped at an outer circumference of the plastic sheet around the lid opening.

6. The process of preparing a concrete according to claim 1, wherein the step of sealing the container of the mixing tool hermetically is accomplished by using a fitted lid of the container of the mixing tool.

7. The process of preparing a concrete according to claim 1, wherein the mixing tool is a pan mixer and the step of sealing the container of the mixing tool hermetically is accomplished by using a top cover of the pan mixer and a sealing material.

8. A process of preparing a concrete, comprising in sequence the steps of:

using a mixing tool, which includes a container and a tumbling mechanism in the container, to form a powder mixture by incorporating and tumbling cement and at least one or a combination of particulate pozzolanic material, non-pozzolanic material, and water-reducing superplasticizer in the container of the mixing tool;

adding shear enhancers and optionally one or a combination of fine gravel and coarse gravel to the powder mixture to form a cement mixture;

sealing the container of the mixing tool hermetically;

mixing the cement mixture thoroughly in the hermetically sealed container of the mixing tool to form a uniformly-distributed concrete mixture;

optionally adding sand to the uniformly-distributed concrete mixture; and adding liquid additives and mixing water with the uniformly-distributed concrete mixture with or without sand, the liquid additives being selected from the group consisting of defoamers and wetting agents in liquid form;

wherein sand should be optionally added only after the step of mixing the cement mixture thoroughly in the hermetically sealed container of the mixing tool to form the uniformly-distributed concrete mixture, the tumbling mechanism comprises blades or paddles and the shear enhancers include polished stones, metal balls or concrete-cast balls or a combination thereof with each stone or ball having a size equal to or greater than ¾ inches but small enough to fit into crevices between the container and the blades or paddles of the mixing tool.

9. The process of preparing a concrete according to claim 8, wherein at least a portion of the shear enhancers is screened out after adding and mixing water with the uniformly-distributed concrete mixture.

10. The process of preparing a concrete according to claim 9, wherein the shear enhancers are screened out by using a removable grill with a catch tray.

11. The process of preparing a concrete according to claim 10, wherein the removable grill comprises parallel metal bars with each metal bar having a cross section of an oval shape or a substantially rectangle shape with rounded top and concave bottom.

12. The process of preparing a concrete according to claim 8, wherein the shear enhancers include metal balls with each metal ball having a size equal to or greater than ¾ inches but small enough to fit into crevices between the container and the blades or paddles of the mixing tool.

13. The process of preparing a concrete according to claim 12, wherein the metal balls are screened out using a magnetic force after the step of adding and mixing water with the uniformly-distributed concrete mixture.

14. A method of preventing premature curing while mixing, transporting, pumping or stowing the concrete prepared according to claim 1, the method comprising the steps of attaching a vibrator to equipment used for mixing, transporting, pumping or stowing the concrete, and shaking and stirring the concrete continually with the vibrator to postpone chemical curing reaction of the concrete.

* * * * *